(12) United States Patent
Xiang et al.

(10) Patent No.: US 11,061,173 B2
(45) Date of Patent: Jul. 13, 2021

(54) PRISM SHEET, PRISM ASSEMBLY AND DISPLAY DEVICE

(71) Applicants: BEIJING BOE OPTOPELECTRONICS TECHNOLOGY CO., LTD., Beijing (CN); BOE TECHNOLOGY GROUP CO., LTD., Beijing (CN)

(72) Inventors: Desheng Xiang, Beijing (CN); Xi Chen, Beijing (CN); Jianye Tang, Beijing (CN); Fuan Zhu, Beijing (CN); Yanchao Zhang, Beijing (CN); Dawei Wang, Beijing (CN); Jiaqiang Wang, Beijing (CN); Yanming Wang, Beijing (CN); Cheng Chang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/643,058

(22) PCT Filed: Jun. 18, 2019

(86) PCT No.: PCT/CN2019/091677
§ 371 (c)(1),
(2) Date: Feb. 28, 2020

(87) PCT Pub. No.: WO2020/001322
PCT Pub. Date: Jan. 2, 2020

(65) Prior Publication Data
US 2020/0333512 A1    Oct. 22, 2020

(30) Foreign Application Priority Data

Jun. 28, 2018  (CN) .......................... 201810686302.7

(51) Int. Cl.
*G02B 5/04* (2006.01)
*G02B 5/06* (2006.01)
(Continued)

(52) U.S. Cl.
CPC ............... *G02B 5/045* (2013.01); *G02B 5/06* (2013.01); *G02F 1/133602* (2013.01); *G02F 1/133607* (2021.01)

(58) Field of Classification Search
CPC ..... G02B 5/045; G02B 5/06; G02F 1/133602; G02F 2001/133607; G02F 1/133606
See application file for complete search history.

(56) References Cited

U.S. PATENT DOCUMENTS

2015/0323712 A1* 11/2015 Lim .......................... B32B 3/30
428/167

FOREIGN PATENT DOCUMENTS

| CN | 101546040 | 9/2009 |
| CN | 102116439 | 7/2011 |

(Continued)

OTHER PUBLICATIONS

Office action from Chinese Application No. 201810686302.7 dated Feb. 3, 2020.
(Continued)

*Primary Examiner* — Donald L Raleigh
(74) *Attorney, Agent, or Firm* — Calfee, Halter & Griswold LLP

(57) ABSTRACT

Disclosed is a prism sheet, a prism assembly, and a display device. The prism assembly includes a first prism sheet and a second prism sheet stacked with the first prism sheet. The first prism sheet includes a plurality of first subareas, and each first subarea includes at least one first sub-prism; the second prism sheet includes a plurality of second subareas, and each second subarea includes at least one second
(Continued)

Fig. 4 sub-prism. An orthographic projection of each first subarea on the second prism sheet corresponds to one of the plurality of second subareas one to one; an extending direction of the at least one first sub-prism in a first subarea is perpendicular to an extending direction of the at least one second sub-prism in a second subarea corresponding to the first subarea.

18 Claims, 13 Drawing Sheets

(51) Int. Cl.
*G02F 1/13357* (2006.01)
*G02F 1/1335* (2006.01)

(56) References Cited

FOREIGN PATENT DOCUMENTS

| | | | | |
|---|---|---|---|---|
| CN | 202305852 | | 7/2012 | |
| CN | 102654589 | | 9/2012 | |
| CN | 105116477 | | 12/2015 | |
| CN | 206057747 | | 3/2017 | |
| CN | 107132694 | | 9/2017 | |
| CN | 108828701 | | 11/2018 | |
| CN | 107132694 | | 12/2018 | |
| CN | 208780959 U | * | 4/2019 | ....... G02F 1/133605 |
| KR | 20110045802 | | 5/2011 | |

OTHER PUBLICATIONS

Office action from Chinese Application No. 201810686302.7 dated Aug. 16, 2019.

* cited by examiner

PRISM SHEET, PRISM ASSEMBLY AND DISPLAY DEVICE

RELATED APPLICATIONS

The present application is a 35 U.S.C. 371 national stage application of PCT International Application No. PCT/CN2019/091677, filed on Jun. 18, 2019, which claims the benefit of Chinese Patent Application No. 201810686302.7, filed on Jun. 28, 2018, the entire disclosures of which are incorporated herein by reference.

TECHNICAL FIELD

The present disclosure relates to the technical field of display device manufacturing, and in particular, to a prism sheet, a prism assembly, and a display device.

BACKGROUND

With the advancement of equipment and technology, display devices are developing towards narrow frame, 18:9 ratio display screen or "full screen". For LCD (Liquid Crystal Display) display modules, to further compress their frames, it is necessary to increase the size of the long side of the backlight film. In the related art, since the size of the long side of the backlight film is increased, technical problems such as wrinkles and bright lines easily occur at the backlight film.

SUMMARY

Exemplary embodiments provide a prism sheet, a prism assembly including the prism sheet, and a display device.

Exemplary embodiments provide a prism sheet. The prism sheet includes: a substrate, a first surface of the substrate including a plurality of subareas, each of the plurality of subareas including a plurality of sub-prisms arranged substantially in parallel. The extending directions of the sub-prisms in two adjacent subareas are different from each other.

In some exemplary embodiments, the plurality of subareas are arranged in an array.

In some exemplary embodiments, in any four subareas intersecting at one point, two subareas have no adjacent edge, and the extending directions of the sub-prisms in these two subareas are the same.

In some exemplary embodiments, a shape of each of the plurality of subareas is rectangular.

In some exemplary embodiments, the prism sheet further includes: a cutting slit; the substrate has a polygonal shape, and the cutting slit is at a vertex of the polygonal shape.

Exemplary embodiments also provide a prism assembly. The prism assembly includes a first prism sheet and a second prism sheet stacked with the first prism sheet. The first prism sheet includes a plurality of first subareas, and each of the plurality of first subareas includes at least one first sub-prism; the second prism sheet includes a plurality of second subareas, and each of the plurality of second subareas includes at least one second sub-prism. An orthographic projection of each of the plurality of first subareas on the second prism sheet corresponds to one of the plurality of second subareas one to one; an extending direction of the at least one first sub-prism in a first subarea is perpendicular to an extending direction of the at least one second sub-prism in a second subarea corresponding to the first subarea.

In some exemplary embodiments, the plurality of first subareas are arranged in an array; in any four first subareas intersecting at one point, two first subareas have no adjacent edge, and the extending directions of the sub-prisms in these two first subareas are the same; the plurality of second subareas are arranged in a rectangular array; in any four second subareas intersecting at one point, two second subareas have no adjacent edge, and the extending directions of the sub-prisms in these two second subareas are the same.

In some exemplary embodiments, a shape of the first prism sheet is a rectangle, and the first prism sheet includes a first side edge; the plurality of first subareas are arranged along the first side edge; the first side edge is a long side or a short side of the rectangle; a shape of the second prism sheet is a rectangle, and the second prism sheet includes a second side edge corresponding to the first side edge; the plurality of second subareas are arranged along the second side edge.

In some exemplary embodiments, the plurality of first subareas intersect at a first intersection point, and each of the plurality of first subareas includes one first sub-prism; extension lines of all first sub-prisms pass through the first intersection point; the plurality of second subareas intersect at a second intersection point, and the extending direction of the at least one second sub-prism in each of the plurality of second subareas is substantially parallel to a tangential direction of a concentric circle or a spiral line centered on the second intersection point; an orthographic projection of the first intersection point on the second prism sheet coincides with the second intersection point.

In some exemplary embodiments, each of the at least one first sub-prism is continuous, and each of the at least one second sub-prism is continuous.

In some exemplary embodiments, each of the at least one first sub-prism includes at least one breakpoint, and each of the at least one second sub-prism includes at least one breakpoint.

In some exemplary embodiments, all the first sub-prisms divide a round angle equally.

In some exemplary embodiments, a distance from inner ends of some first sub-prisms to a center of the first prism sheet is a, a distance from inner ends of other first sub-prisms to the center is b, and a>b.

In some exemplary embodiments, the first prism sheet and the second prism sheet have the same polygonal shape; at least one of the first prism sheet and the second prism sheet further includes a cutting slit, and the cutting slit is at a vertex of the polygonal shape.

In some exemplary embodiments, the at least one first sub-prism is on a surface of the first prism sheet facing away from the second prism sheet; the at least one second sub-prism is on a surface of the second prism sheet facing away from the first prism sheet.

Exemplary embodiments also provide a display device including a backlight module. The backlight module includes a light source assembly and the prism assembly according to any one of above-mentioned embodiments.

BRIEF DESCRIPTION OF THE DRAWINGS

In order to more clearly illustrate the technical solutions in embodiments of the disclosure or in the prior art, the appended drawings needed to be used in the description of the exemplary embodiments or the prior art will be introduced briefly in the following. Obviously, the drawings in the following description are only some embodiments of the disclosure, and for those of ordinary skills in the art, other drawings may be obtained according to these drawings under the premise of not paying out creative work.

DETAILED DESCRIPTION OF THE DISCLOSURE

In the following, the technical solutions in exemplary will be described clearly and completely in connection with the drawings in the exemplary embodiments of the disclosure. Obviously, the described exemplary embodiments are only part of the embodiments of the disclosure, and not all of the embodiments. Based on the exemplary embodiments in the disclosure, all other embodiments obtained by those of ordinary skills in the art under the premise of not paying out creative work pertain to the protection scope of the disclosure.

Exemplary embodiments provide a prism sheet, a prism assembly including the prism sheet, and a display device. The prism sheet can effectively improve the problem of wrinkles and bright lines.

Figure 1:
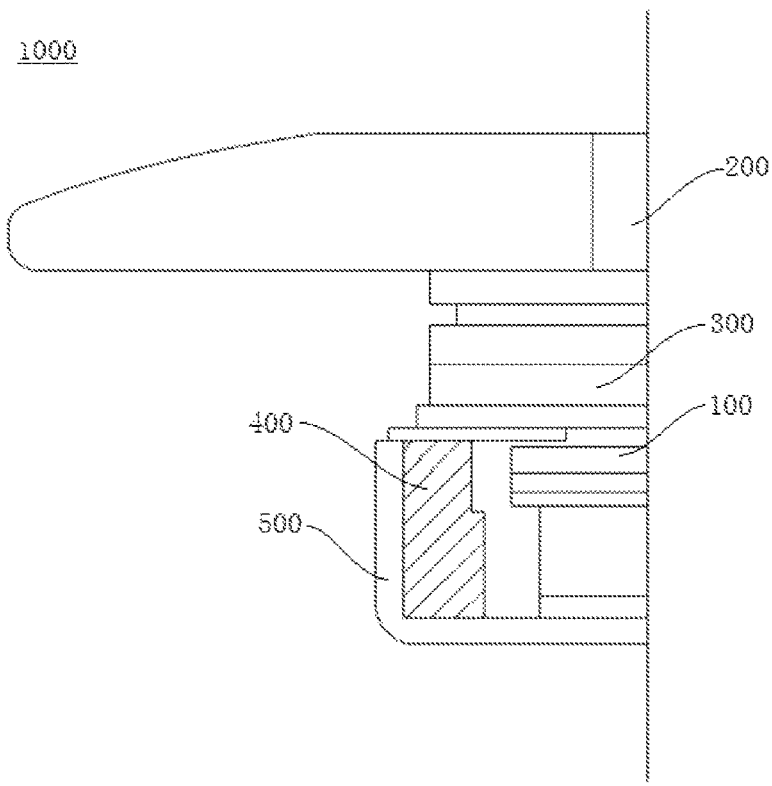
FIG. 1 is a cross-sectional view of a display device according to an exemplary embodiment.
Figure 2:
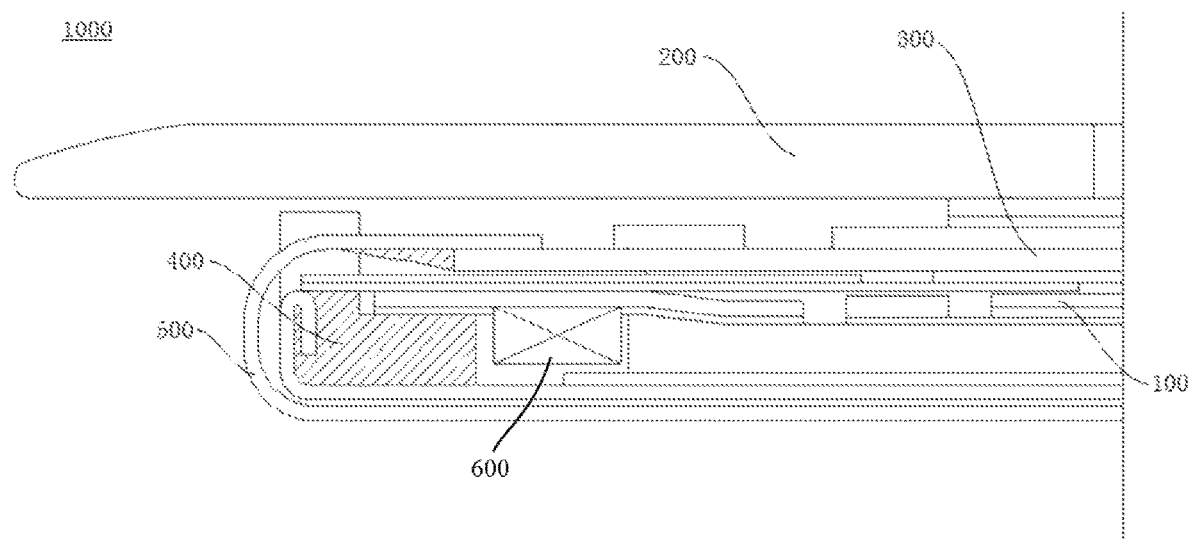
FIG. 2 is a cross-sectional view of the display device according to the embodiment of the present disclosure in another direction.

As shown in FIG. 1 and FIG. 2, the display device 1000 includes a glass cover 200, a liquid crystal panel 300, a backlight module 400, a frame 500 and a prism assembly 100. The backlight module 400 can be used as a light source. The backlight module 400 includes a prism assembly 100.

The prism assembly 100 has a light collection capability, and the glass cover 200 plays a protection role in the display device 100.

The prism assembly and the prism sheet according to the exemplary embodiments are described below with reference to FIG. 1-FIG. 16.

An exemplary embodiment provides a prism sheet. As shown in FIGS. 3-10, the prism sheet 1 includes: a substrate, a first surface of the substrate including a plurality of subareas 11, each of the plurality of subareas 11 including a plurality of sub-prisms 12 arranged substantially in parallel. The extending directions of the sub-prisms 12 in two adjacent subareas 11 are different from each other.

Figure 3:
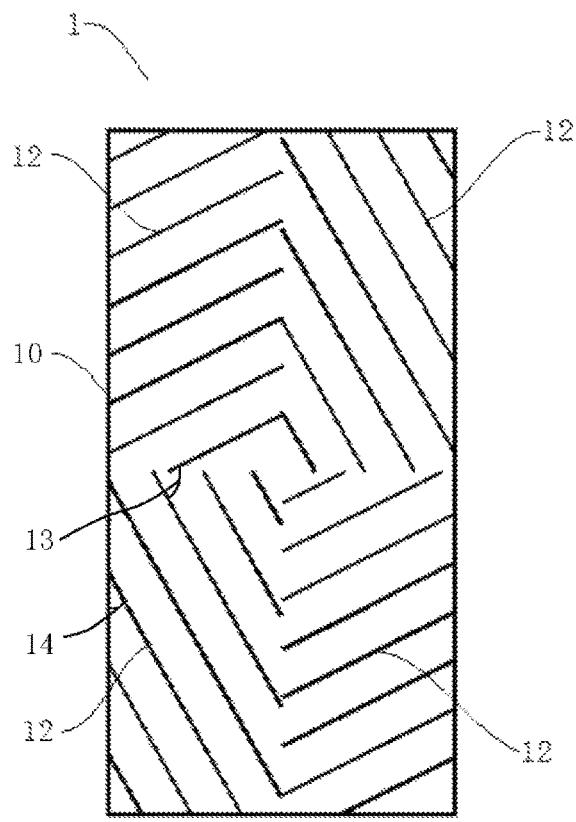
FIG. 3 is a schematic structural diagram of a prism sheet according to an exemplary embodiment.

As shown in FIG. 3, the prism sheet 1 includes a first surface having a plurality of subareas 11, and each of the plurality of subareas 11 includes a plurality of sub-prisms 12 disposed substantially in parallel. The first surface has a polygonal (e.g., rectangular) shape. The extending directions of the sub-prisms 12 respectively located in two subareas 11 adjacent to each other along the direction of the first side edge 10 form a first included angle 13; the included angle 14 between the extending direction of each of the plurality of sub-prisms 12 and the first side edge 10 is an acute angle.

Further, the extending directions of the sub-prisms 12 in the adjacent subareas 11 of the prism sheet 1 are different from each other. When the subareas 11 on the prism sheet 1 are affected by changes in the external environment, the deformation of any two adjacent subareas 11 on the prism sheet 1 can be suppressed by each other, thereby effectively preventing the deformation of the prism sheet 1 from being too large and reducing the deformation of the prism sheet 1 during a reliability test.

According to the prism sheet 1 of the exemplary embodiment, the sub-prisms 12 in the adjacent subareas 11 in the prism sheet 1 have different extending directions, so that the subarea 11 has a function of suppressing deformation of any adjacent subarea 1 adjacent to it, thereby effectively preventing the deformation of the prism sheet 1 from being too large and reducing the deformation of the prism sheet 1 during the reliability test.

Figure 7:
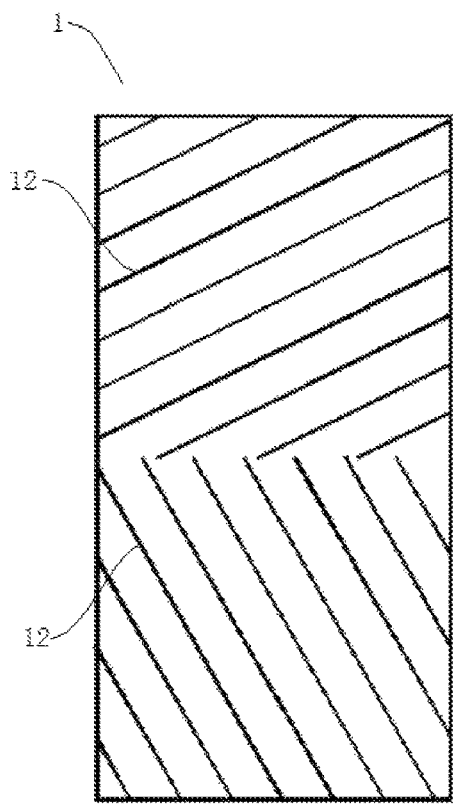
FIG. 7 is a schematic structural diagram of a prism sheet according to an exemplary embodiment.
Figure 8:
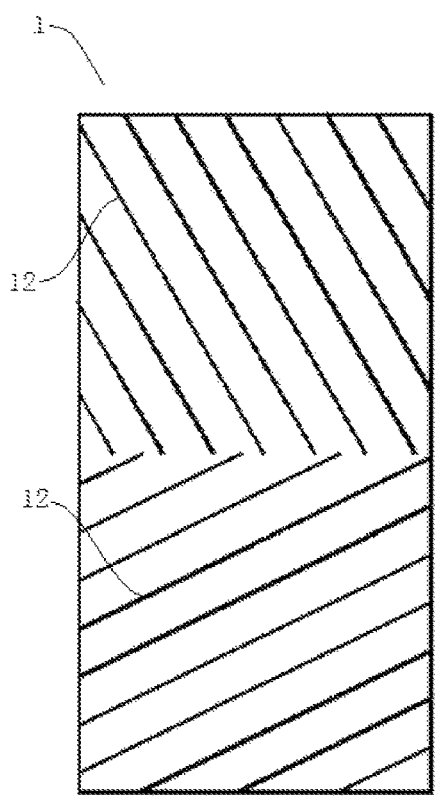
FIG. 8 is a schematic structural diagram of a prism sheet according to another exemplary embodiment.
Figure 9:
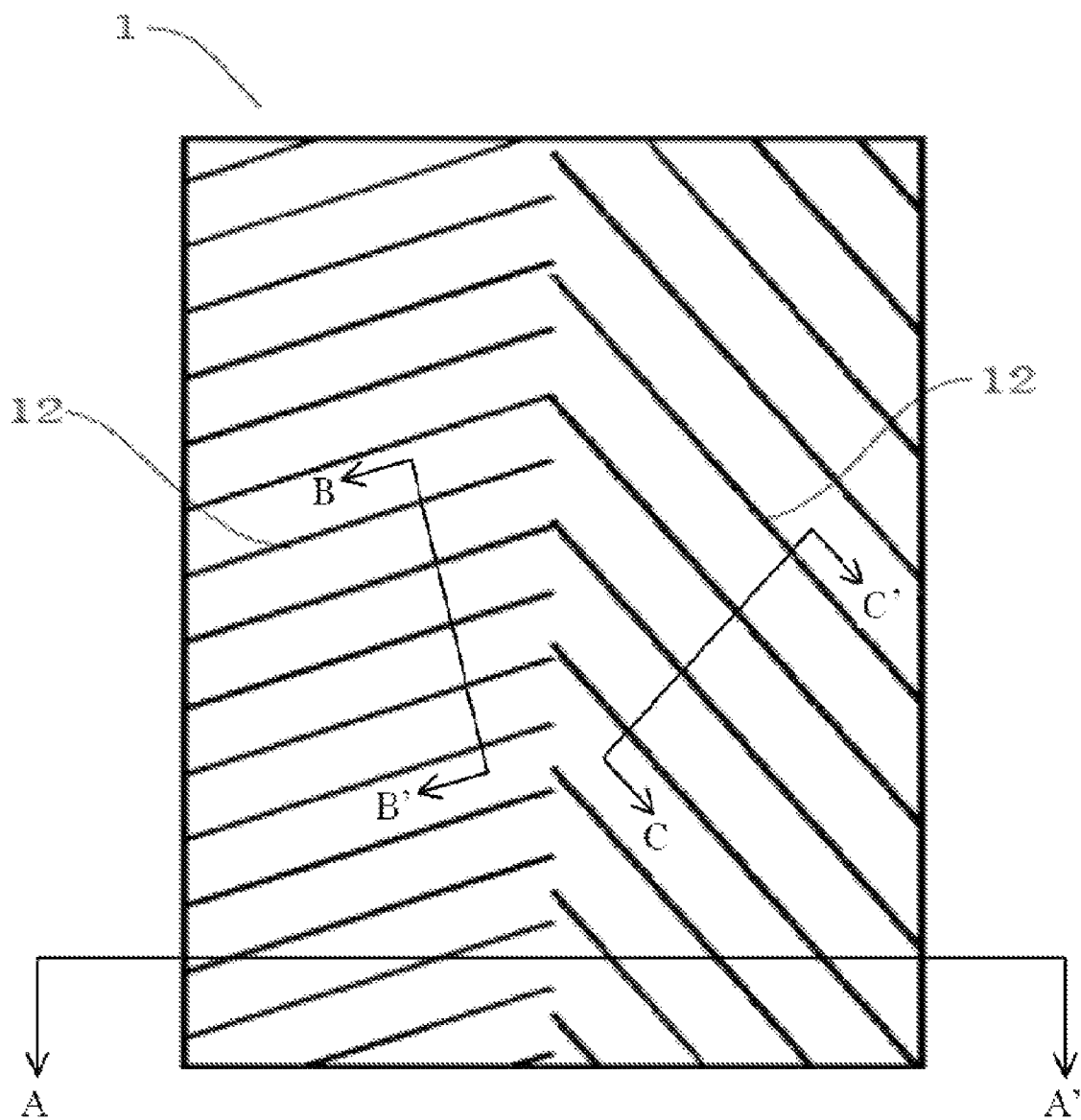
FIG. 9 is a schematic structural diagram of a prism sheet according to an exemplary embodiment.
Figure 10:
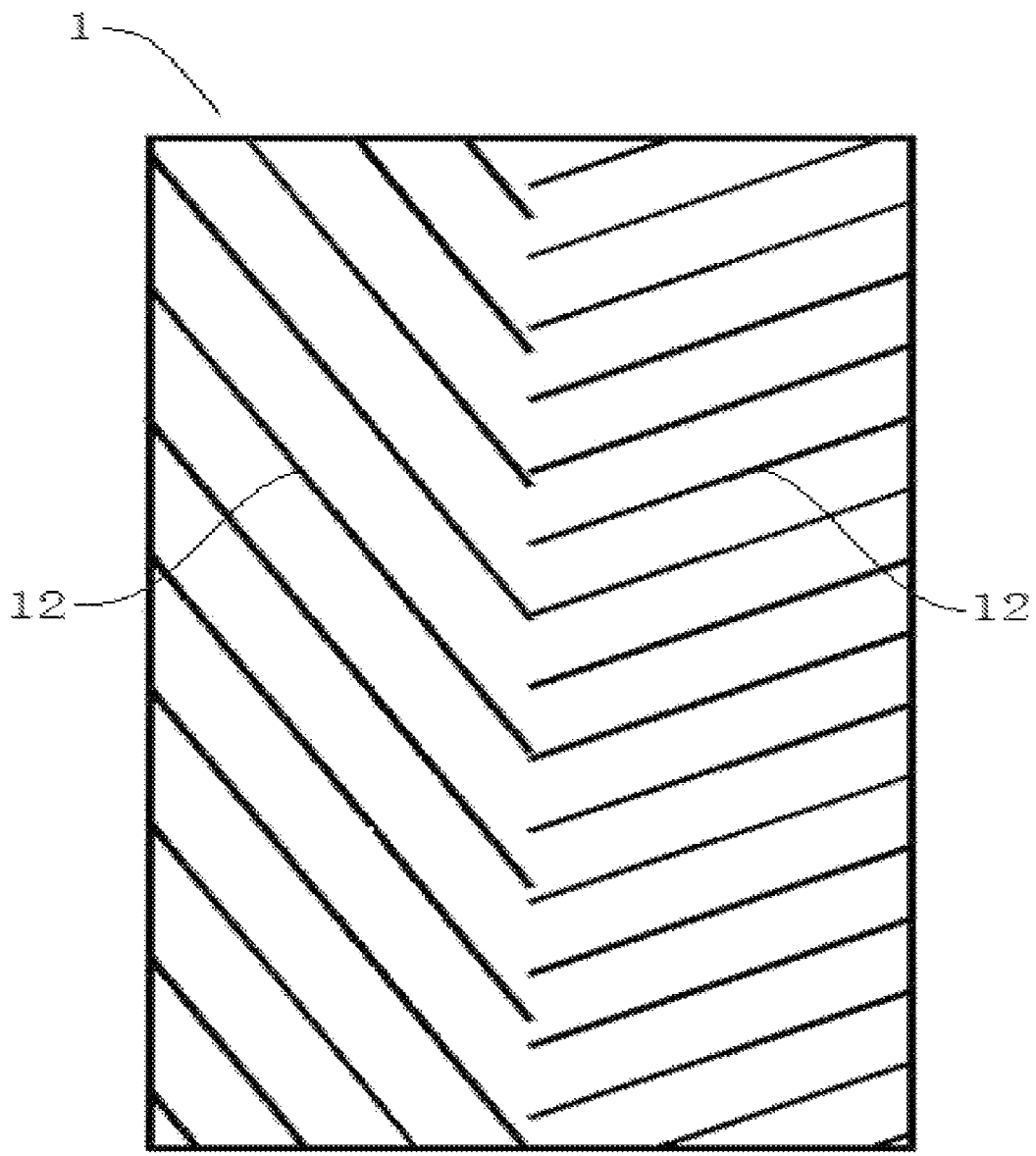
FIG. 10 is a schematic structural diagram of a prism sheet according to yet another exemplary embodiment.

In some exemplary embodiments, the plurality of subareas 11 are arranged along a direction of a first side edge; the first side edge is a long side or a short side of the rectangle. As shown in FIGS. 7 and 8, the plurality of subareas 11 are arranged along the direction of the long side. As shown in FIGS. 9 and 10, the plurality of subareas 11 are arranged in the direction of the short side.

In some exemplary embodiments, as shown in FIGS. 3-6, the plurality of subareas are arranged in an array. In this way, stress can be dispersed more evenly.

In some exemplary embodiments, as shown in FIGS. 3-6, in any four subareas 11 intersecting at one point, two subareas have no adjacent edge, and the extending directions of the sub-prisms in these two subareas are the same.

In some exemplary embodiments, the shape of each of the plurality of subareas is rectangular. As shown in FIGS. 7 and 8, each of the plurality of subareas 11 has a square shape.

Figure 13:
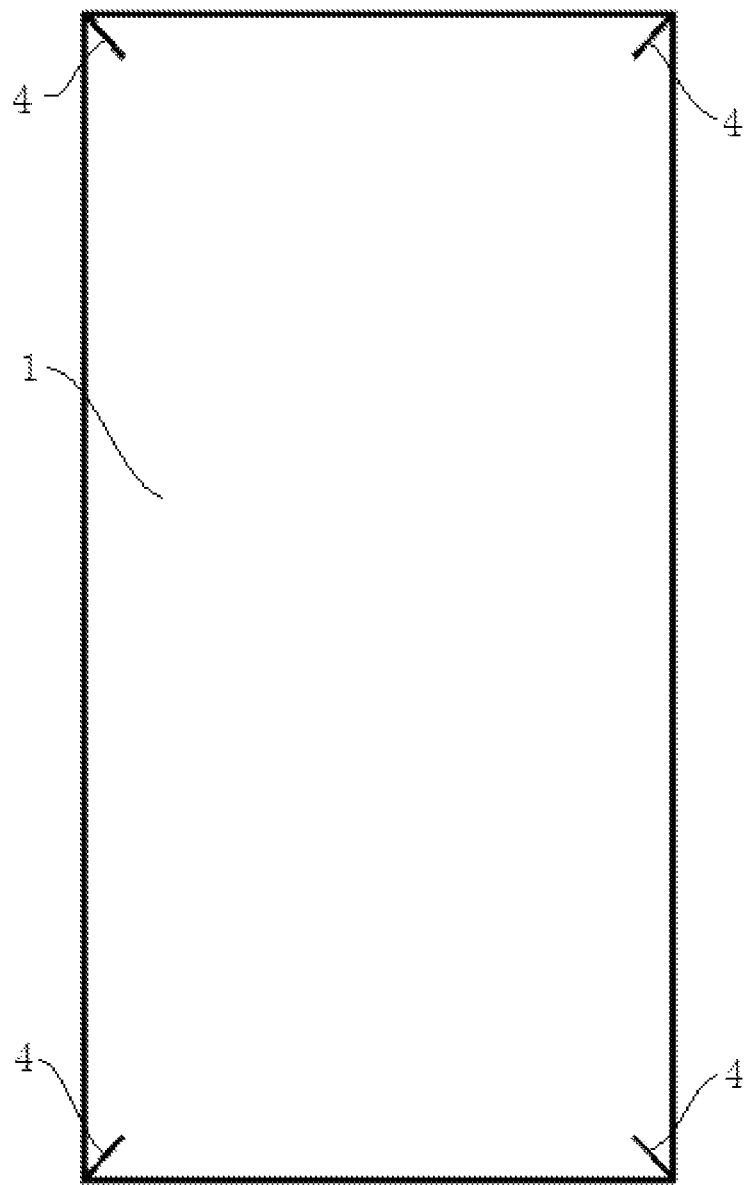
FIG. 13 is a schematic structural diagram of a prism sheet according to an exemplary embodiment.

In some exemplary embodiments, as shown in FIG. 13, the prism sheet further includes a cutting slit 4; the substrate has a polygonal shape, and the cutting slit 4 is at a vertex of the polygonal shape. When the prism sheet 1 is affected by changes in the external environment, a certain amount of deformation will be generated. The slit 4 can release the stress of the prism sheet 1, thereby preventing problems such as wrinkles for the prism sheet 1.

Figure 14:
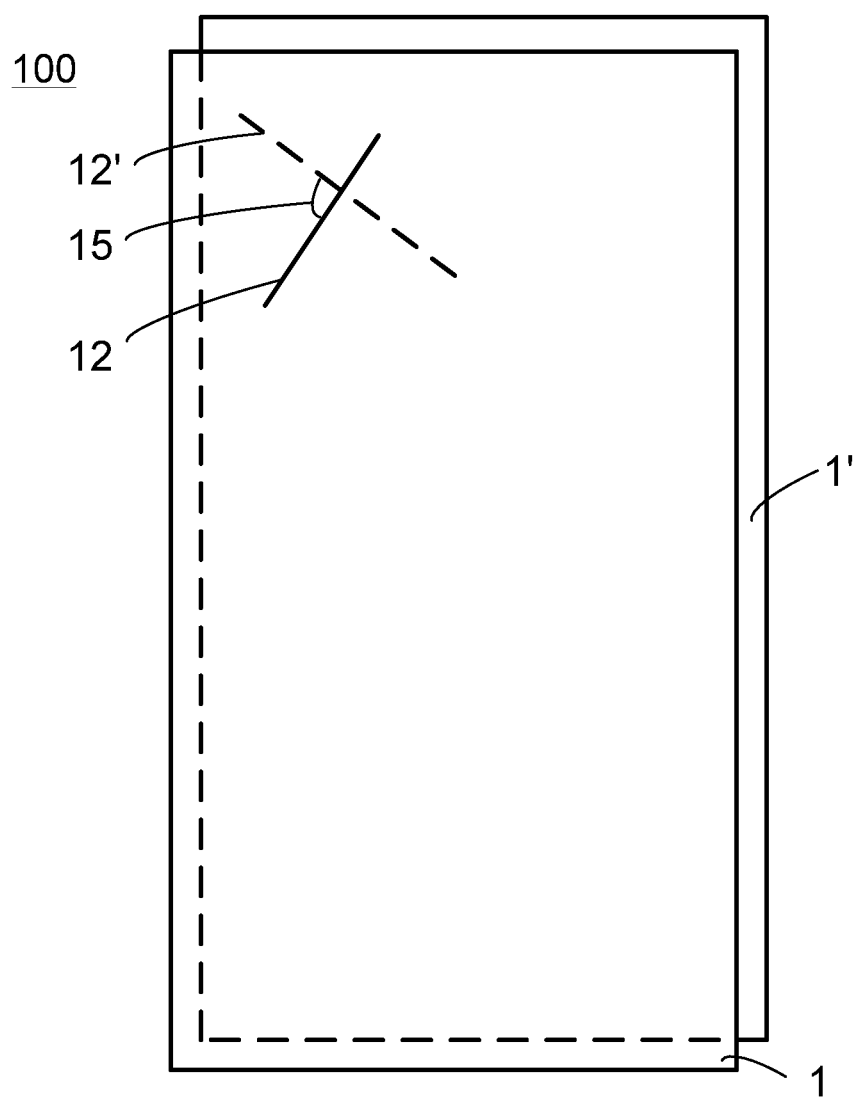
FIG. 14 is a schematic structural diagram of a prism assembly according to an exemplary embodiment.

According to an exemplary embodiment, as shown in FIG. 14, the prism assembly 100 includes two stacked prism sheets 1 and 1' as described in the above exemplary embodiment. The plurality of subareas in one prism sheet correspond to the plurality of subareas in the other prism sheet one-to-one in the stacking direction of these two prism sheets; the extending directions of the sub-prisms 12 and 12' respectively located in two corresponding subareas form a second included angle 15.

Specifically, the extending directions of the sub-prisms 12 in the adjacent subareas 11 of the same prism sheet 1 are different from each other (that is, there is a first included angle between the prisms 12 located in two adjacent subareas 11). When the subareas 11 on the same prism sheet 1 are affected by changes in the external environment, the deformation of any two adjacent subareas 11 on the prism sheet 1 can be suppressed by each other, thereby effectively preventing the deformation of the prism sheet 1 from being too large and reducing the deformation of the prism sheet 1 during a reliability test.

It can be understood that the larger the first included angle is, the better the suppression effect between two adjacent subareas 11 is, and the better the effect of preventing the deformation of the prism sheet 1 from being too large. Optionally, the first included angle is 90°.

Further, the extending directions of two sub-prisms 12 located in two subareas 11 corresponding to each other in the thickness direction of the two prism sheets 1 are different (that is, there is a second included angle between the prisms 12 of two subareas 11 corresponding to each other in the thickness direction). Such an arrangement can effectively improve the light effect in the viewing angle range.

It should be noted that an acute angle is formed between each of the plurality of sub-prisms 12 and the length direction of the prism sheet 1 in which the sub-prism 12 is located, which can suppress the deformation of the subarea 11. When the sub-prism 12 is parallel or perpendicular to the length direction of the prism sheet 1 in which the sub-prism 12 is located, the subarea 11 in which the sub-prism 12 is located is subject to a large amount of deformation when affected by changes in the external environment, and the deformation of the prism sheet 1 cannot be effectively suppressed.

It can be understood that the structures of the two prism sheets 1 in the prism assembly 100 can be the same, and such an arrangement can save a lot of development time and improve efficiency.

According to the prism assembly 100 provided by the exemplary embodiment, by arranging the prism sheet 1 in a partitioned manner, adjacent subareas 11 of each of the plurality of prism sheets 1 have a function of mutually suppressing deformation, so that the deformation of the prism sheet 1 can be effectively prevented from being too large, the deformation of the prism sheet 1 during the reliability test can thus be reduced. Moreover, the extending directions of the sub-prisms 12 in the subareas 11 corresponding to each other in the thickness direction of the two prism sheets 1 form a second included angle, which can ensure the light effect in the viewing angle range.

As shown in FIG. 7, FIG. 8, FIG. 9, and FIG. 10, in some exemplary embodiments, the shape of each of the plurality of subareas 11 is square, and the plurality of subareas 11 of each prism sheet 1 are sequentially disposed along the length direction of the prism sheet 1 or sequentially disposed along the width direction of the prism sheet 1. Such an arrangement can effectively prevent the prism sheet 1 from being excessively deformed in the length direction or the width direction.

As shown in FIG. 7 and FIG. 8, in an exemplary embodiment, the number of the subareas 11 in each prism sheet 1 is two, and the two subareas 11 are oppositely disposed in the length direction of the prism sheet 1. The two subareas 11 of each prism sheet 1 are sequentially disposed along the length direction of the prism sheet 1 in which they are located. These two adjacent subareas 11 restrain each other from deforming, so that the prism sheet 1 can be effectively prevented from being deformed too much in the length direction.

Further, the expansion and contraction deformation of the prism sheet 1 mainly occurs in the length direction. Disposing two subareas 11 along the length direction can effectively suppress the deformation of the prism sheet 1 in the length direction, and alleviate the problems of bright lines and wrinkles after the reliability test of the prism assembly 100.

As shown in FIG. 9 and FIG. 10, in another exemplary embodiment, the plurality of subareas 11 of each prism sheet 1 are sequentially disposed along the width direction of the prism sheet 1 in which they are located. These two adjacent subareas 11 restrain each other from deforming, so that the prism sheet 1 can be effectively prevented from being deformed too much in the width direction.

Figure 4:
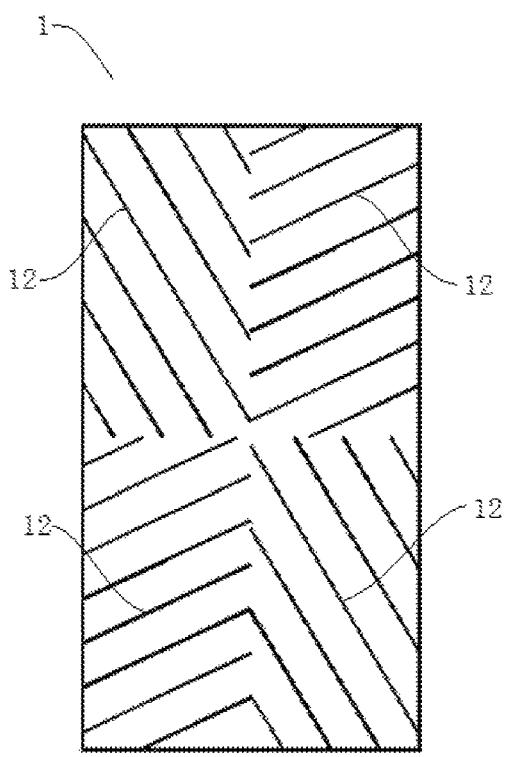
FIG. 4 is a schematic structural diagram of a prism sheet according to another exemplary embodiment.

As shown in FIGS. 3 and 4, in some exemplary embodiments, each of the plurality of subareas 11 is square, and the plurality of subareas 11 in each prism sheet 1 are sequentially disposed along the length direction and the width direction of the prism sheet 1. Providing the plurality of subareas 11 in both the length and width directions of the prism sheet 1 can make the multiple subareas 11 in the prism sheet 1 more uniformly stressed, thereby improving the suppression effect between adjacent subareas 11. Therefore, the deformation of the prism sheet 1 is suppressed comprehensively and effectively, and the wrinkle problem of the prism sheet 1 can be effectively alleviated.

Specifically, any two adjacent subareas 11 disposed in the length direction may suppress deformation mutually, so that the prism sheet 1 can be effectively prevented from being deformed too much in the length direction; any two adjacent subareas 11 disposed in the width direction may suppress deformation mutually, so that the prism sheet 1 can be effectively prevented from being deformed too much in the width direction.

Figure 5:
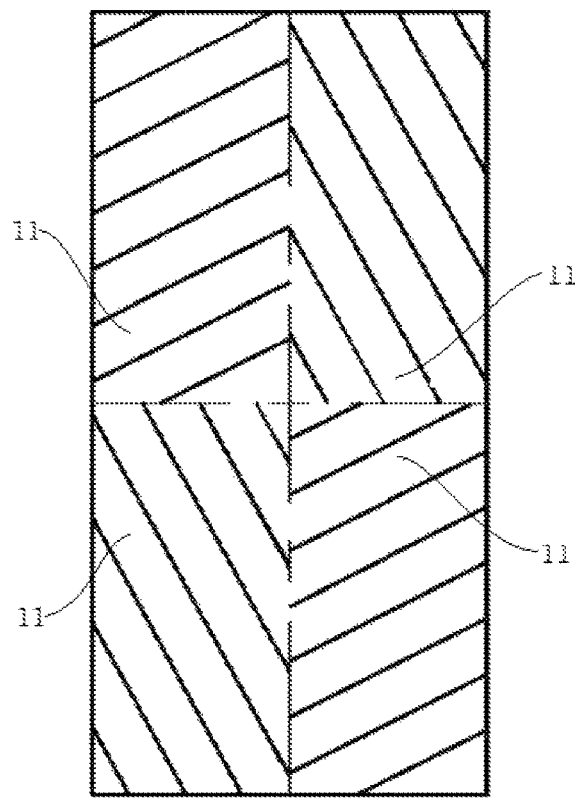
FIG. 5 is a schematic diagram of the subareas of the prism sheet shown in FIG. 3.
Figure 6:
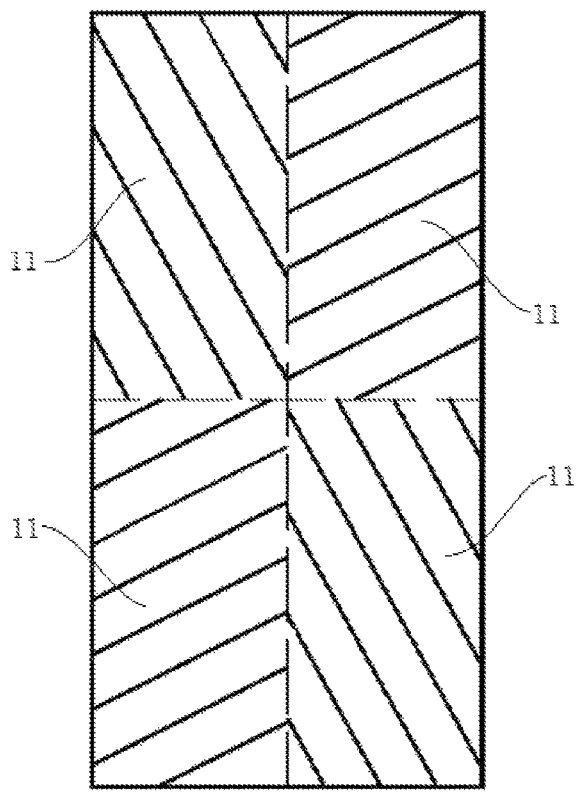
FIG. 6 is a schematic diagram of the subareas of the prism sheet shown in FIG. 4.

As shown in FIG. 7 and FIG. 8, in some exemplary embodiments, each of the plurality of subareas 11 is a square. The subarea 11 with such a shape facilitates the imprinting of the two prism sheets 1 and facilitates corresponding arrangement of the two prism sheets 1 in the thickness direction. It should be noted that the subareas 11 in FIG. 5 and FIG. 6 are separated by dotted lines, so that the subareas 11 of the prism sheet 1 can be easily understood.

As shown in FIGS. 3 and 4, in some exemplary embodiments, the plurality of subareas 11 of each prism sheet 1 are disposed in an array. In any four subareas 11 intersecting at one point, two subareas have no adjacent edge, and the extending directions of the sub-prisms 12 in these two subareas are the same. Such an arrangement makes the included angle between the sub-prisms 12 in any two adjacent subareas 11 the same, so that the suppression effect between the two adjacent subareas 11 is improved, the stress on the prism sheet 1 is more uniform, and the anti-wrinkle effect of the prism sheet 1 is improved.

In some exemplary embodiments, the first included angle 13 and the second included angle 15 are equal. Optionally, the first included angle 13 is 90°-120°, and the acute included angle 14 is 30°-60°. If the first included angle 13 is equal to the second included angle 15, it is not necessary to design and manufacture the two prism sheets 1 separately, and only one kind of the prism sheet 1 should be designed. It can be understood that if the first included angle is equal to the second included angle, the processing and imprinting of the prism assembly 100 are more convenient.

Specifically, when the acute included angle is within the range of 30°-60°, the suppression effect between two adjacent subareas 11 is better, and the anti-wrinkle effect of the prism sheet 1 is better.

With reference to FIG. 1, FIG. 2, and FIG. 13, in some exemplary embodiments, the prism sheet 1 is rectangular, and the prism sheet 1 may include a cutting slit 4 at a vertex of the polygonal shape. When the prism sheet 1 is affected by changes in the external environment, a certain amount of deformation will be generated. The arrangement of the cutting slit 4 can release the stress of the prism sheet 1, thereby preventing problems such as wrinkles on the prism sheet 1.

Optionally, the cutting slit 4 may be disposed at the frame 500 of the display device 1000, which can prevent the cutting slit 4 from being exposed, thereby improving the display effect of the display device 1000 and improving the user experience.

Optionally, the cutting slit 4 may be shielded by a light-shielding tape at the cutting slit 4. Such an arrangement may have a good shielding effect on the cutting slit 4, so that the cutting slit 4 is invisible after the prism assembly 100 is assembled.

An exemplary embodiment provides a prism assembly. The prism assembly includes a first prism sheet and a second prism sheet stacked with the first prism sheet. The first prism sheet includes a plurality of first subareas, and each of the plurality of first subareas includes at least one first sub-prism; the second prism sheet includes a plurality of second subareas, and each of the plurality of second subareas includes at least one second sub-prism. An orthographic projection of each of the plurality of first subareas on the second prism sheet corresponds to one of the plurality of second subareas one to one; an extending direction of the at least one first sub-prism in a first subarea is perpendicular to an extending direction of the at least one second sub-prism in a second subarea corresponding to the first subarea.

In an exemplary embodiment, an extending direction of a plurality of first sub-prisms located in a first subarea is perpendicular to an extending direction of a plurality of second sub-prisms located in a second subarea corresponding to the first subarea. In this way, the light effect in the viewing angle range of the prism assembly 100 can be ensured.

Figure 17:
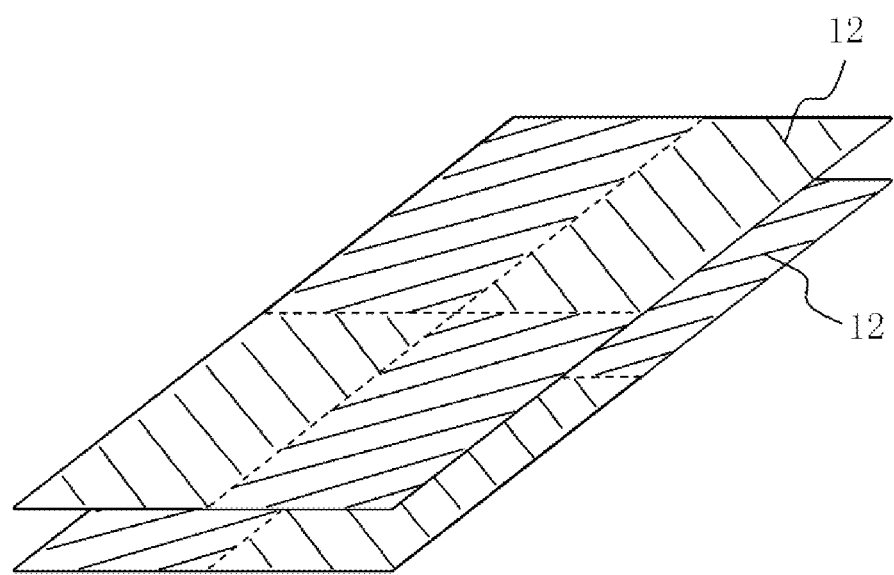
FIG. 17 is a schematic diagram of a prism assembly according to an exemplary embodiment.

For example, the prism assembly may include the prism sheet as shown in FIG. 3 and the prism sheet as shown in FIG. 4 stacked with the prism sheet as shown in FIG. 3. FIG. 17 is a schematic diagram of a prism assembly according to an exemplary embodiment. In the prism assembly shown in FIG. 17, the prism sheet as shown in FIG. 4 is stacked with the prism sheet as shown in FIG. 3. Alternatively, the prism assembly may include the prism sheet as shown in FIG. 5 and the prism sheet as shown in FIG. 6 stacked with the prism sheet as shown in FIG. 5. Alternatively, the prism assembly may include the prism sheet as shown in FIG. 7 and the prism sheet as shown in FIG. 8 stacked with the prism sheet as shown in FIG. 7. Alternatively, the prism assembly may include the prism sheet as shown in FIG. 9 and the prism sheet as shown in FIG. 10 stacked with the prism sheet as shown in FIG. 9. Alternatively, the prism assembly may include the prism sheet as shown in FIG. 11 and the prism sheet as shown in FIG. 12 stacked with the prism sheet as shown in FIG. 11. When the prism assembly includes the prism sheet as shown in FIG. 5 and the prism sheet as shown in FIG. 6 stacked with the prism sheet as shown in FIG. 5, the plurality of first subarea are arranged in an array; in any four first subareas intersecting at one point, two first subareas have no adjacent edge, and the extending directions of the sub-prisms in these two first subareas are the same; the plurality of second subareas are arranged in a rectangular array; in any four second subareas intersecting at one point, two second subareas have no adjacent edge, and the extending directions of the sub-prisms in these two second subareas are the same.

Figure 11A:
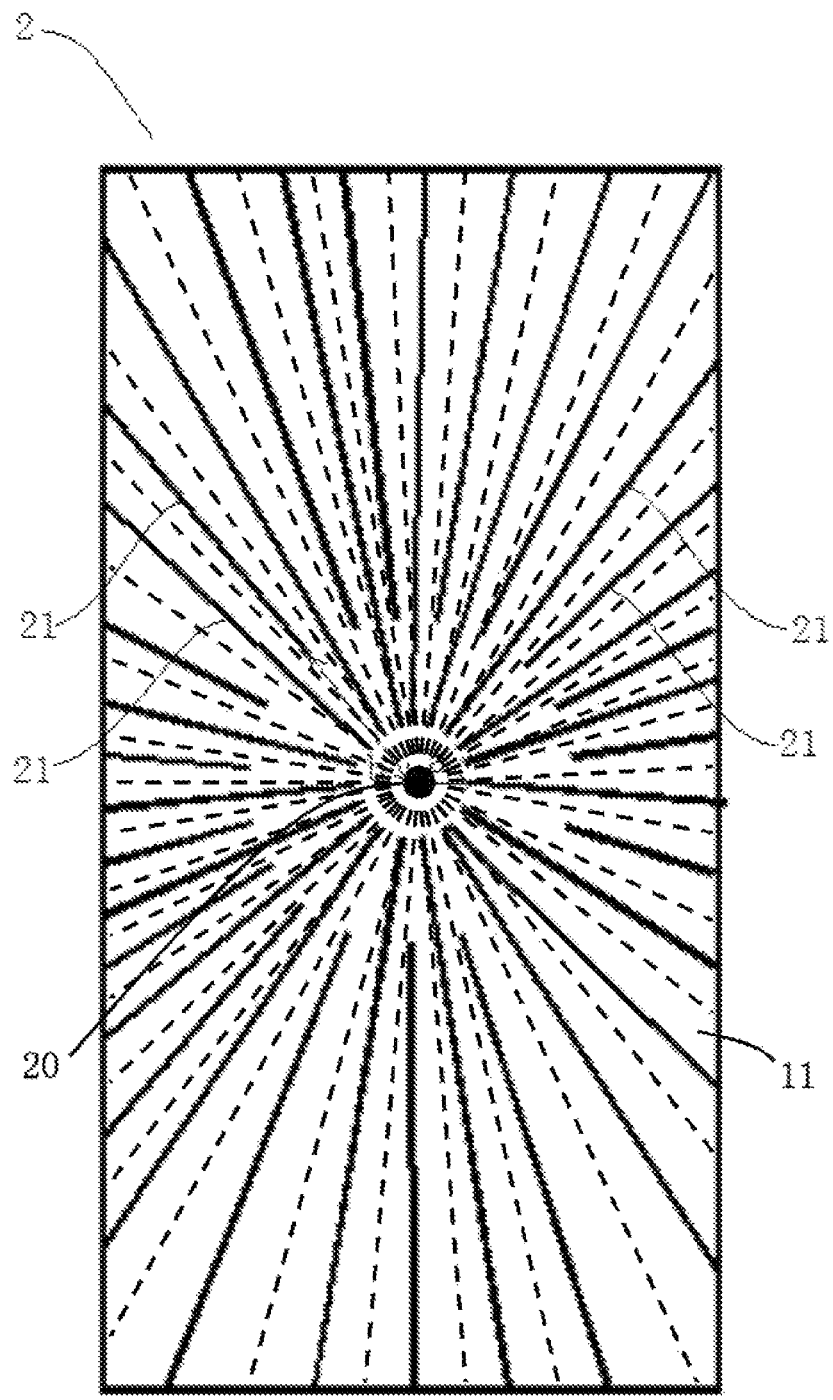
FIG. 11a and FIG. 11b are schematic structural diagrams of a first prism sheet according to an exemplary embodiment.
Figure 11B:
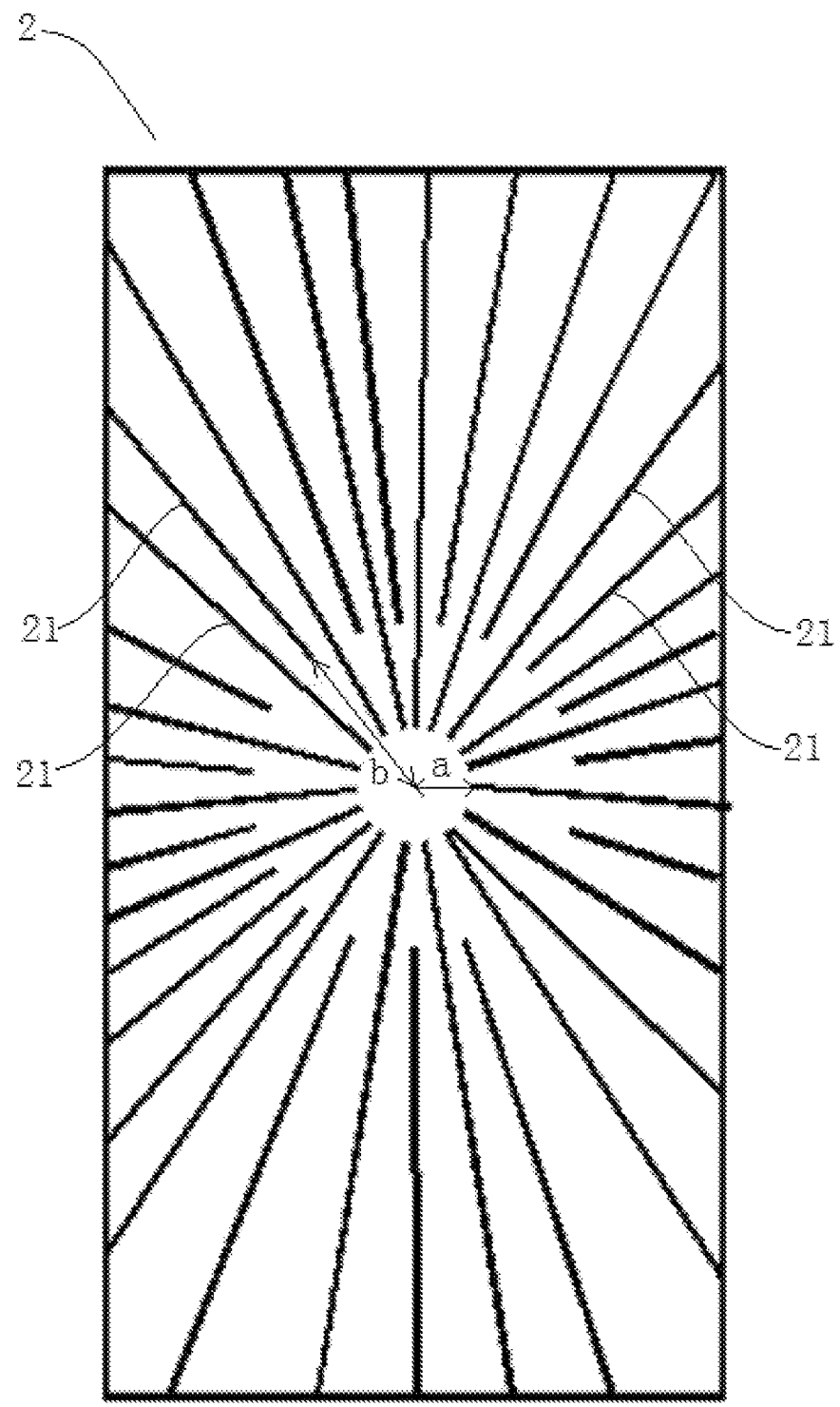
Figure 12:
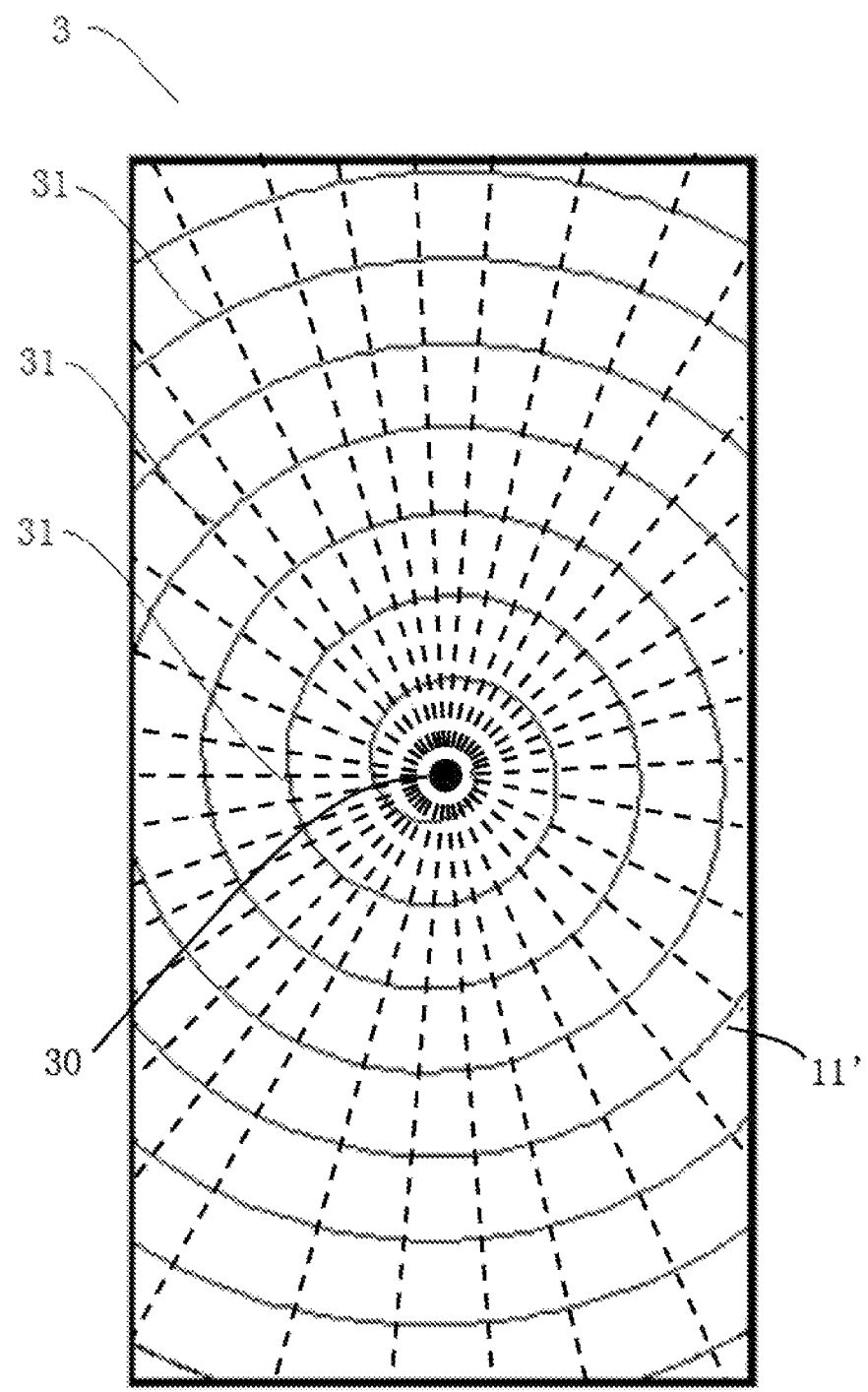
FIG. 12 is a schematic structural diagram of a second prism sheet according to an exemplary embodiment.

In some exemplary embodiments, as shown in FIGS. 11a, 11b and 12, the prism sheet 2 includes a plurality of first subareas 11 separated by dotted lines, and the prism sheet 3 includes a plurality of second subareas 11' separated by dotted lines. The plurality of first subareas 11 intersect at a first intersection point 20, and each of the plurality of first subareas 11 includes one first sub-prism 21; extension lines of all first sub-prisms 21 pass through the first intersection point 20; the plurality of second subareas 11' intersect at a second intersection point 30, and the extending direction of the at least one second sub-prism 31 in each of the plurality of second subareas 11' is substantially parallel to a tangential direction of a concentric circle or a spiral line centered on the second intersection point 30; an orthographic projection of the first intersection point 20 on the second prism sheet 3 coincides with the second intersection point 30.

As shown in FIGS. 11a, 11b and 12, the plurality of second sub-prisms 31 in the second prism sheet 3 constitute a shape of a spiral line, and such a structure can effectively prevent the problem of moire defects. It can be understood that the plurality of second sub-prisms 31 may form a spiral line or a concentric circle shape, and the extending direction of the first prism 21 may be designed corresponding to the extending direction of the second prism 31. Therefore, it is not necessary to spend too much time designing the extending directions for the second sub-prism 31 and the first sub-prisms 21, which saves the design man-hours.

In some exemplary embodiments, each of the at least one first sub-prism is continuous, and each of the at least one second sub-prism is continuous. Alternatively, in some exemplary embodiments, each of the at least one first sub-prism includes at least one breakpoint, and each of the at least one second sub-prism includes at least one breakpoint. In this way, the problem of moire defects can be effectively solved.

As shown in FIGS. 11a, 11b and 12, in some exemplary embodiments, all the first sub-prisms divide a round angle equally. This design can simplify the manufacturing process of the prism sheet 2.

Specifically, after the first prism sheet 2 is mated with the second prism sheet 3, for the projection of the first prism sheet 2 in the thickness direction, a certain included angle is between the extending direction of the first sub-prism 21 and the tangential direction of the second sub-prism 31 corresponding to the first sub-prism 21. The larger the included angle, the better the light effect in the viewing angle range. The largest included angle is a right angle, that is, the extending direction of the first sub-prism 21 is perpendicular to the tangential direction of the second sub-prism 31.

As shown in FIG. 11, in some exemplary embodiments, a distance from inner ends of some first sub-prisms 21 to a center of the first prism sheet is a, a distance from inner ends of other first sub-prisms 21 to the center is b, and a>b. Such a structure facilitates the processing of the first sub-prism 21, and can effectively prevent the concentration of stress on the end of the first sub-prism 21 near the center of the first prism sheet 2, thereby improving the reliability of the first prism sheet 2. If the first sub-prisms 21 are all converged to one point, the prism sheet cannot be made easily, and the performance of the prism sheet will be affected.

In some optional exemplary embodiments of the present disclosure, referring to FIG. 11b, the first sub-prisms 21 having the distance a from the center of the first prism sheet 2 and the first sub-prisms 21 having the distance b from the center are alternately disposed. Such a structure can effectively improve the reliability of the first prism sheet 2. It should be noted that the included angle between any two adjacent first sub-prisms 21 can be adjusted according to design requirements, thereby adjusting the light effect of the prism assembly 100.

In some exemplary embodiments, the first prism sheet 2 and the second prism sheet 3 have the same polygonal shape; at least one of the first prism sheet and the second prism sheet further includes a cutting slit 4, and the cutting slit 4 is at a vertex of the polygonal shape (as shown in FIG. 13). The arrangement of the cutting slit 4 can release the stress of the prism sheet, so as to better prevent the prism sheet from wrinkling.

In some exemplary embodiments, the at least one first sub-prism is on a surface of the first prism sheet facing away from the second prism sheet; the at least one second sub-prism is on a surface of the second prism sheet facing away from the first prism sheet. For example, two prism sheets are arranged in an up-down direction, and the upper surface of the upper prism sheet faces away from the lower prism sheet, and the lower surface of the lower prism sheet faces away from the upper prism sheet. Correspondingly, the sub-prism of the upper prism sheet may be disposed on the upper surface of the upper prism sheet, and the sub-prism of the lower prism sheet may be disposed on the lower surface of the lower prism sheet.

Figure 15A:
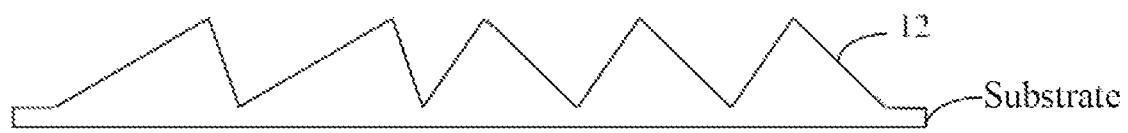
FIG. 15a is a schematic cross-sectional view of the prism sheet shown in FIG. 9 taken along line AA'.
Figure 15B:
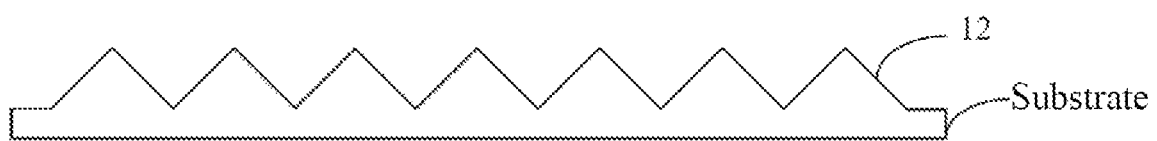
FIG. 15b is a schematic cross-sectional view of the prism sheet shown in FIG. 9 taken along line BB' or CC'.
Figure 15C:
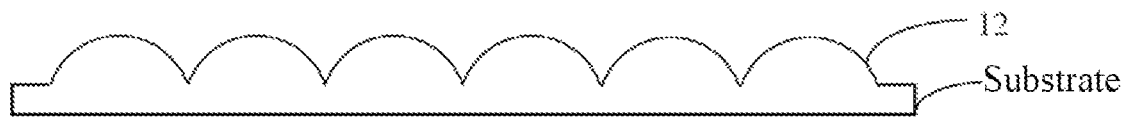
FIG. 15c is a schematic cross-sectional view of the prism sheet shown in FIG. 9 taken along line BB' or CC'.

In exemplary embodiments of the present disclosure, in a cross-section perpendicular to the extending direction of the prism, the sub-prism may have a triangular or semicircular shape (as shown in FIGS. 15a-15c), which is not limited in the present disclosure. The substrate may be made of the materials commonly used in the art such as PET. In each prism sheet, the structure and size parameters of the sub-prisms in two adjacent subareas may be exactly the same (or they may be different from each other).

Although not shown, those skilled in the art can understand that, in any one of the exemplary embodiments shown in FIG. 3 to FIG. 10, the size parameters (such as the vertex angle of the sub-prisms, the prism width of the sub-prisms, etc.) of the sub-prisms in two adjacent subareas can be exactly the same (or different). In the exemplary embodiments shown in FIG. 11a and FIG. 11b, the size parameters (such as the vertex angle, prism width, etc.) of the sub-prisms in two adjacent subareas may be exactly the same (or different).

Figure 16:
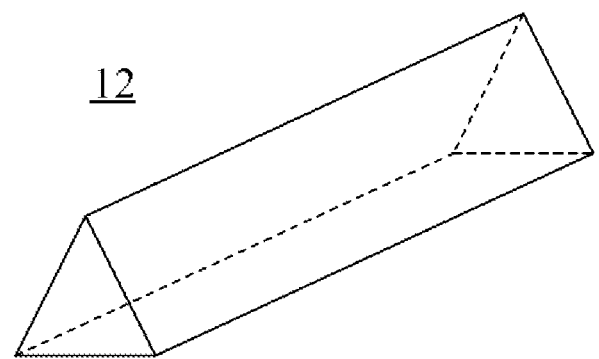
FIG. 16 is a schematic diagram of a sub-prism having a triangular cross-section.

FIG. 15a is a schematic cross-sectional view of the prism sheet shown in FIG. 9 taken along line AA'. The structural dimension parameters of the sub-prisms in two adjacent subareas may be exactly the same. Since the extending direction of the sub-prisms in separate subareas may be different from each other, the shapes of the cross-sections of the sub-prisms located in separate subareas may be different from each other. FIG. 15b is a schematic cross-sectional view of the prism sheet shown in FIG. 9 taken along line BB' or line CC', where the cross-section of each of the plurality of sub-prisms is triangular. FIG. 15c is a schematic cross-sectional view of the prism sheet shown in FIG. 9 taken along line BB' or line CC', where the cross-section of each of the plurality of sub-prisms is semicircular. In the exemplary embodiment shown in FIG. 9, line BB' is perpendicular to the extending direction of the sub-prism 12 on the left side of the prism sheet 1; line CC' is perpendicular to the extending direction of the sub-prism 12 on the right side of the prism sheet 1. FIG. 16 is a schematic diagram of a sub-prism having a triangular cross-section.

As shown in FIGS. 1 and 2, according to an exemplary embodiment, a display device 1000 includes a backlight module 400. The backlight module 400 includes a light source assembly 600 and the prism assembly 100 described above. By applying the above-mentioned prism assembly 100, it is possible to effectively prevent the deformation of the prism assembly 100 from being too large during use, the deformation of the prism sheet 1 can be reduced during the reliability test, the service life of the backlight module 400 can be increased, and the display effect of the display device 1000 can be effectively ensured.

In the description herein, it is to be understood that the orientation or positional relationship indicated by the terms "center", "longitudinal", "transverse", "length", "width", "thickness", "upper", "lower", "front", "back", "left", "right", "vertical", "horizontal", "top", "bottom", "inside", "outside", "clockwise", "counterclockwise", "axial", "radial", "circumferential" and the like is based on the orientation or positional relationship shown in the drawings, and is merely for the convenience of describing the present disclosure and simplifying the description. The orientation or positional relationship is not intended to indicate or imply that the device or component must be constructed and operated in a particular orientation, and should not to be construed as limiting the disclosure. Moreover, the features defined by "first" or "second" may include one or more of the features either explicitly or implicitly. In the description of the present disclosure, the meaning of "a plurality" is two or more unless explicitly and specifically defined otherwise.

In the present specification, the reference term "an embodiment", "some embodiments", "example", "specific example", or "some examples" and the like means that the specific feature, structure, material, or characteristic described in connection with the embodiment or example is included in at least one embodiment or example of the present disclosure. In the present specification, the schematic representation of the above terms is not necessarily directed to the same embodiment or example. Furthermore, the specific features, structures, materials, or characteristics described may be combined in a suitable manner in any one or more embodiments or examples.

The above exemplary embodiments are only used for explanations rather than limitations to the present disclosure, the ordinary skilled person in the related technical field, in the case of not departing from the spirit and scope of the present disclosure, may also make various modifications and variations, therefore, all the equivalent solutions also belong to the scope of the present disclosure, the patent protection scope of the present disclosure should be defined by the claims.

What is claimed is:

1. A prism sheet, comprising: a substrate, a first surface of the substrate comprising a plurality of subareas, each of the plurality of subareas comprising a plurality of sub-prisms arranged substantially in parallel;

wherein extending directions of the plurality of sub-prisms in two adjacent subareas of the plurality of subareas are different from each other;

wherein the plurality of subareas are arranged in an array; in any four subareas of the plurality of subareas intersecting at one point, two subareas have no adjacent edge, and the extending directions of the plurality of sub-prisms in these two subareas are the same.

2. The prism sheet according to claim 1, wherein a shape of each of the plurality of subareas is rectangular.

3. The prism sheet according to claim 1, further comprising: a cutting slit; the substrate has a polygonal shape, and the cutting slit is at a vertex of the polygonal shape.

4. A prism assembly, comprising: a first prism sheet and a second prism sheet stacked with the first prism sheet;

wherein the first prism sheet comprises a plurality of first subareas, and each of the plurality of first subareas comprises at least one first sub-prism; the second prism sheet comprises a plurality of second subareas, and each of the plurality of second subareas comprises at least one second sub-prism;

and wherein an orthographic projection of each of the plurality of first subareas on the first prism sheet corresponds to one of the plurality of second subareas one to one; an extending direction of the at least one first sub-prism in a first subarea of the plurality of first subareas is perpendicular to an extending direction of the at least one second sub-prism in a second subarea of the plurality of second subareas corresponding to the first subarea.

5. The prism assembly according to claim 4, wherein the plurality of first subareas are arranged in an array; in any four first subareas of the plurality of first subareas intersecting at one point, two first subareas have no adjacent edge, and the extending directions of the plurality of sub-prisms in these two first subareas are the same;

and wherein the plurality of second subareas are arranged in a rectangular array; in any four second subareas of the plurality of second subareas intersecting at one point, two second subareas have no adjacent edge, and the extending directions of the plurality of sub-prisms in these two second subareas are the same.

6. The prism assembly according to claim 4, wherein the plurality of first subareas intersect at a first intersection point, and each of the plurality of first subareas comprises one first sub-prism; extension lines of all first sub-prisms of the plurality of first subareas pass through the first intersection point; the plurality of second subareas intersect at a second intersection point, and the extending direction of the at least one second sub-prism in each of the plurality of second subareas is substantially parallel to a tangential direction of a concentric circle or a spiral line centered on the second intersection point; an orthographic projection of the first intersection point on the second prism sheet coincides with the second intersection point.

7. The prism assembly according to claim 4, wherein each of the at least one first sub-prism is continuous, and each of the at least one second sub-prism is continuous.

8. The prism assembly according to claim 4, wherein each of the at least one first sub-prism comprises at least one breakpoint, and each of the at least one second sub-prism comprises at least one breakpoint.

9. The prism assembly according to claim 6, wherein all the first sub-prisms divide a round angle equally.

10. The prism assembly according to claim 6, wherein a distance from inner ends of some first sub-prisms to a center of the first prism sheet is a, a distance from inner ends of other first sub-prisms to the center is b, and a>b.

11. The prism assembly according to claim 4, wherein the first prism sheet and the second prism sheet have the same polygonal shape; at least one of the first prism sheet and the second prism sheet further comprises a cutting slit, and the cutting slit is at a vertex of the polygonal shape.

12. The prism assembly according to claim 4, wherein the at least one first sub-prism is on a surface of the first prism sheet facing away from the second prism sheet; the at least one second sub-prism is on a surface of the second prism sheet facing away from the first prism sheet.

13. A display device comprising a backlight module; wherein the backlight module comprises a light source assembly and the prism assembly according to claim 4.

14. The display device according to claim 13, wherein the plurality of first subareas are arranged in an array; in any four first subareas of the plurality of first subareas intersecting at one point, two first subareas have no adjacent edge, and the extending directions of the sub-prisms in these two first subareas are the same;

and wherein the plurality of second subareas are arranged in a rectangular array; in any four second subareas of the plurality of second subareas intersecting at one point, two second subareas have no adjacent edge, and the extending directions of the plurality of sub-prisms in these two second subareas are the same.

15. The display device according to claim 13, wherein the plurality of first subareas intersect at a first intersection point, and each of the plurality of first subareas comprises one first sub-prism; extension lines of all first sub-prisms of the plurality of first subareas pass through the first intersection point; the plurality of second subareas intersect at a second intersection point, and the extending direction of the at least one second sub-prism in each of the plurality of second subareas is substantially parallel to a tangential direction of a concentric circle or a spiral line centered on the second intersection point; an orthographic projection of the first intersection point on the second prism sheet coincides with the second intersection point.

16. The display device according to claim 13, wherein each of the at least one first sub-prism is continuous, and each of the at least one second sub-prism is continuous.

17. The display device according to claim 13, wherein each of the at least one first sub-prism comprises at least one breakpoint, and each of the at least one second sub-prism comprises at least one breakpoint.

18. The display device according to claim 15, wherein all the first sub-prisms divide a round angle equally.

* * * * *